(12) United States Patent
Iwase

(10) Patent No.: US 9,223,029 B2
(45) Date of Patent: Dec. 29, 2015

(54) POSITIONING DEVICE AND STORAGE MEDIUM

(71) Applicant: KABUSHIKI KAISHA TOYOTA CHUO KENKYUSHO, Nagakute-shi, Aichi-ken (JP)

(72) Inventor: Tatsuya Iwase, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 573 days.

(21) Appl. No.: 13/679,521

(22) Filed: Nov. 16, 2012

(65) Prior Publication Data

US 2013/0135145 A1 May 30, 2013

(30) Foreign Application Priority Data

Nov. 24, 2011 (JP) ................. 2011-256648

(51) Int. Cl.
*G01S 19/47* (2010.01)
*G01S 19/44* (2010.01)

(52) U.S. Cl.
CPC ........ *G01S 19/44* (2013.01); *G01S 19/47* (2013.01)

(58) Field of Classification Search
CPC ............................. G01S 19/44; G01S 19/47
USPC .................................................. 342/357.3
See application file for complete search history.

(56) References Cited

U.S. PATENT DOCUMENTS

2008/0114544 A1* 5/2008 Liu et al. ............... 701/213
2008/0303713 A1* 12/2008 Han .................... 342/357.04

FOREIGN PATENT DOCUMENTS

| JP | A-10-253734 | 9/1998 |
|---|---|---|
| JP | A-2001-099910 | 4/2001 |
| JP | A-2006-138834 | 6/2006 |
| JP | A-2007-121066 | 5/2007 |
| JP | A-2008-039691 | 2/2008 |
| JP | A-2009-25049 | 2/2009 |
| JP | A-2009-053152 | 3/2009 |
| JP | A-2009-128055 | 6/2009 |
| JP | A-2010-071686 | 4/2010 |

OTHER PUBLICATIONS

Office Action issued in Japanese Patent Application No. 2011-256648 dated Oct. 1, 2013 (with translation).
U.S. Appl. No. 14/002,890, filed Sep. 3, 2013.
U.S. Appl. No. 13/044,030, filed Mar. 9, 2011 in the name of Yoshiko Kojima et al.

* cited by examiner

*Primary Examiner* — Frank J McGue
(74) *Attorney, Agent, or Firm* — Oliff PLC

(57) ABSTRACT

An equation derivation section derives an observation equation that employs M epochs worth of GPS data and INS data as observation values to derive for each of the GPS satellites a float solution for number of waves of GPS data carrier wave between each of plural GPS satellites and a vehicle, wherein the range of float solutions of the number of waves is constrained by the vehicle travel path estimated based on M epochs worth of INS data. The observation equation is solved by a float solution computation section and float solutions computed for the number of waves N and the position of the vehicle for each of the GPS satellites. Fixed solutions with highest consistency are computed by a fixed solution computation section based on the float solutions for the number of waves N for each of the GPS satellites and the position of the vehicle.

3 Claims, 9 Drawing Sheets $d = (N+\Phi)\lambda$

GPS satellite i $r^i_{rov}$ $r^i_{base}$ d

MOVING STATION (VEHICLE) rov    BASE STATION base

POSITIONING DEVICE AND STORAGE MEDIUM

CROSS-REFERENCE TO RELATED APPLICATION

This application claims priority under 35 USC 119 from Japanese Patent Application No. 2011-256648, filed on Nov. 24, 2011, the entire contents of which are herein incorporated by reference.

FIELD

The present invention relates to a positioning device and a storage medium.

BACKGROUND

A proposal exists for a horizontal navigation system for an Automated Ground Vehicle (AGV) including a carrier wave difference Global Positioning System (GPS) device and a laser scanner (see for example Japanese Patent Application Laid-Open (JP-A) No. 2006-138834). In the system of JP-A No. 2006-138834, the navigation error is estimated using a tightly-coupled Extended Kalman Filter (EKF). A double difference code and carrier wave phase from a two frequency GPS receiver and relative position arising from laser scanner measurements are used as EKF measurement values.

In positioning employing GPS data, when a single frequency GPS receiver is used there is an issue that since the location is estimated based on a state amount of the current time data and immediately preceding time data, the solution readily falls into a local solution and is susceptible to noise. According to the system of JP-A No. 2006-138834, improvements can be obtained in measurement precision using a frequency diversity effect. However, two frequency GPS receivers are much more expensive than single frequency GPS receivers, and hence suffer from a lack of general applicability.

SUMMARY

The present invention is directed towards solving the above issues, and an object is to acquire a positioning solution with good precision even when a single frequency GPS receiver is employed.

In order to achieve the above objective, the positioning device of the present invention is configured including: an acquisition section that, at every epoch, acquires GPS data containing a pseudorange and a phase transmitted from each of a plurality of GPS satellites, and acquires INS data containing a movement amount of a moving body to which the device is installed; a derivation section that derives an observation equation, employing the GPS data and the INS data acquired by the acquisition section as observation values, for deriving, for each of the plurality of GPS satellites, a float solution for a number of waves of carrier wave for the GPS data present between each of the plurality of GPS satellites and the moving body, wherein the observation equation is derived with a range of float solutions for the number of waves constrained by a travel path of the moving body estimated based on INS data for 3 epochs or greater; a computation section that solves the observation equation derived by the derivation section and computes a float solution for the number of waves for each of the plurality of GPS satellites; and a positioning section that, based on the respective float solutions of the number of waves for each of the plurality of GPS satellites computed by the computation section, computes a fixed solution of number of waves of highest consistency, and positions the location of the moving body based on the distance between the plurality of respective GPS satellites from which the fixed solution of number of waves is obtained and the moving body.

According to the positioning device of the present invention, the acquisition section acquires, at every epoch, GPS data containing the pseudorange and the phase transmitted from each of the plural GPS satellites, and acquires Inertial Navigation System (INS) data containing the movement amount of the moving body to which the device is installed. The derivation section derives the observation equation, employing the GPS data and the INS data acquired by the acquisition section as observation values, for deriving, for each of the plural GPS satellites, the float solution for the number of waves of carrier wave for the GPS data present between each of the plural GPS satellites and the moving body, wherein the observation equation is derived with the range of the float solutions for the number of waves constrained by the travel path of the moving body estimated based on the INS data for 3 epochs or greater. Then the computation section solves the observation equation derived by the derivation section and computes the float solution for the number of waves for each of the GPS satellites. The positioning section then, based on the respective float solutions of the number of waves for each of the GPS satellites computed by the computation section, computes the fixed solution of number of waves of highest consistency, and positions the location of the moving body based on the distance between the plural respective GPS satellites from which the fixed solution of number of waves is obtained and the moving body.

The precision of the float solution is accordingly raised and the search range of the fixed solution is narrowed by constraining the float solution for the number of waves with the movement path of the moving body estimated based on the INS data of 3 or more epochs. Hence a positioning solution can be obtained with good precision even when a single frequency GPS receiver is employed.

The positioning device of the present invention may also be configured further including a controller that, based on the observation equation derived by the derivation section, controls to remove, from the GPS data acquired by the acquisition section, any GPS data containing pseudoranges with a residual error to the travel path of a predetermined threshold value or greater, or all GPS data transmitted from a GPS satellite that has transmitted the GPS data containing pseudoranges with a residual error to the travel path of a predetermined threshold value or greater, and controls the derivation section to derive an observation equation again. Positioning precision is hence raised further due to being able to remove received inconsistent GPS data that has been influenced by such factors as multi-paths.

A storage medium of the present invention is a storage medium storing a positioning program that causes a computer to function as: an acquisition section that, at every epoch, acquires GPS data containing a pseudorange and a phase transmitted from each of a plurality of GPS satellites, and acquires INS data containing a movement amount of a moving body to which the device is installed; a derivation section that derives an observation equation, employing the GPS data and the INS data acquired by the acquisition section as observation values, for deriving, for each of the plurality of GPS satellites, a float solution for a number of waves of carrier wave for the GPS data present between each of the plurality of GPS satellites and the moving body, wherein the observation equation is derived with a range of float solutions for the number of waves constrained by a travel path of the moving body estimated based on INS data for 3 epochs or greater; a computation section that solves the observation equation derived by the derivation section and computes a float solution for the number of waves for each of the plurality of GPS satellites; and a positioning section that, based on the respective float solutions of the number of waves for each of the plurality of GPS satellites computed by the computation section, computes a fixed solution of number of waves of highest consistency, and positions the location of the moving body based on the distance between the plurality of respective GPS satellites from which the fixed solution of number of waves is obtained and the moving body.

The storage medium of the present invention is not particularly limited, and may be a hard disk and may be a ROM. A CD-ROM and DVD disk, magneto-optical disk and IC card may also be employed therefor.

As explained above, according to the positioning device and storage medium of the present invention, the precision of float solution is raised and the search range of the fixed solution is narrowed by constraining the float solution for the number of waves with the movement path of the moving body estimated based on the INS data of 3 or more epochs. The advantageous effect that a positioning solution can be obtained with good precision even when a single frequency GPS receiver is employed is accordingly exhibited.

BRIEF DESCRIPTION OF DRAWINGS

Exemplary embodiments of the present invention will be described in detail based on the following figures, wherein.

DESCRIPTION OF EMBODIMENTS

Detailed explanation follows regarding an exemplary embodiment of the present invention, with reference to the drawings. In the present exemplary embodiment, explanation is given of an example in which the present invention is applied to a vehicle installed positioning device for positioning a location of a vehicle.

Figure 1:
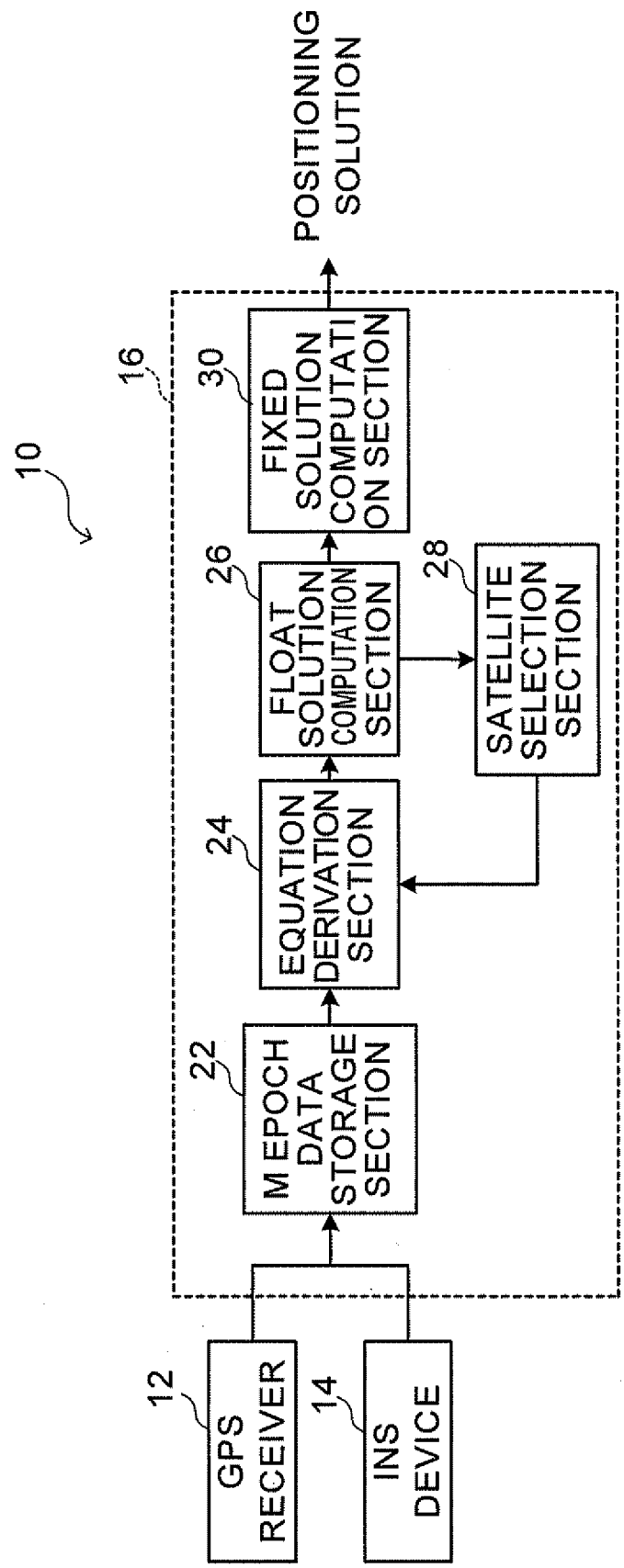
FIG. 1 is a block diagram illustrating a functional configuration of a positioning device according to a present exemplary embodiment.

As illustrated in FIG. 1, a positioning device 10 of the present exemplary embodiment is configured including a single frequency GPS receiver 12 that receives GPS data transmitted from a GPS satellite and base station, an INS device 14 that acquires INS data containing a vehicle movement amount, and a computer 16 that computes a positioning solution based on the GPS data and the INS data.

The GPS data received by the GPS receiver 12 includes a pseudorange, phase and ephemeris. The INS device 14 is equipped with a velocity sensor, yaw rate sensor and gyro sensor. The INS device 14 computes a vehicle movement amount based on detected values that have been detected by each of the sensors.

The computer 16 is configured including a CPU, a ROM stored with a program for executing a positioning processing routine, described later, RAM for temporary data storage, and a storage device such as a HDD.

When represented as functional blocks following a positioning processing routine explained below, the computer 16 can be expressed, as illustrated in FIG. 1, as an M epoch data storage section 22 that stores for each epoch the GPS data received with the GPS receiver 12 and the INS data acquired with the INS device 14, an equation derivation section 24 that acquires M epochs worth of GPS data and INS data from the M epoch data storage section 22 and derives an observation equation combining the GPS data and the INS data, a float solution computation section 26 that computes a float solution from the observation equation, a satellite selection section 28 that selects inconsistent GPS satellites based on residual error, and a fixed solution computation section 30 that computes a fixed solution from the float solution.

Explanation follows regarding the principles of the present exemplary embodiment.

Figure 2:
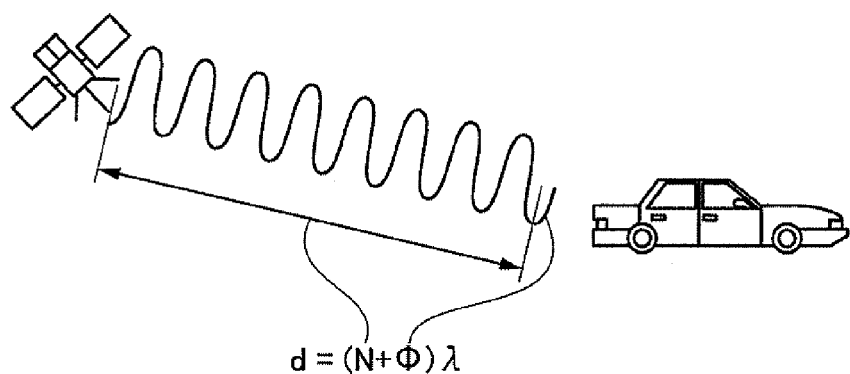
FIG. 2 is an illustration of distance estimation in which the number of waves is employed.

As illustrated in FIG. 2, the location of a vehicle can be positioned when a distance d from a vehicle to each of plural GPS satellites is known. If $\lambda$ is the wavelength of the carrier wave transmitted from the GPS satellite, N is the number of waves of the carrier wave in the distance d and $\phi$ is the phase, then distance d can be derived from the following Equation (1).

$$d = (N + \phi)\lambda \quad (1)$$

$\lambda$ is a known value and it is possible to acquire the phase $\phi$ from the GPS data received by the GPS receiver 12, however the number of waves N cannot be observed. If the number of waves N could be estimated at high precision then the distance d could be estimated at high precision, and a high precision positioning solution would be obtained.

A pseudorange acquired as GPS data is employed to estimate the number of waves N. There is relatively high precision for the phase $\phi$ acquired as GPS data, however the pseudorange $\rho$ is known to have low precision. To address this, first d in the above Equation (1) is substituted with the pseudorange $\rho$ and a rough number of waves N (decimal, float solution) is derived by the following Equation (2).

$$N = \rho/\lambda - \phi \quad (2)$$

Figure 3:
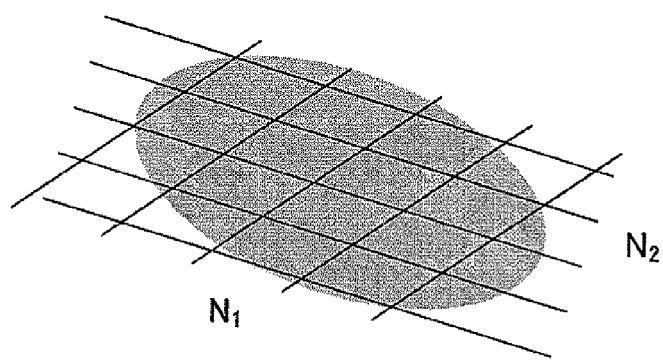
FIG. 3 is an illustration of deriving a fixed solution from float solutions.

As stated above, pseudoranges received from each GPS satellite are employed, and the number of waves N is derived for all the GPS satellites from which GPS data has been received. For example, as illustrated in FIG. 3, a search is made for an integer solution (fixed solution) consistent for all the GPS satellites by for example a grid point search.

Figure 4:
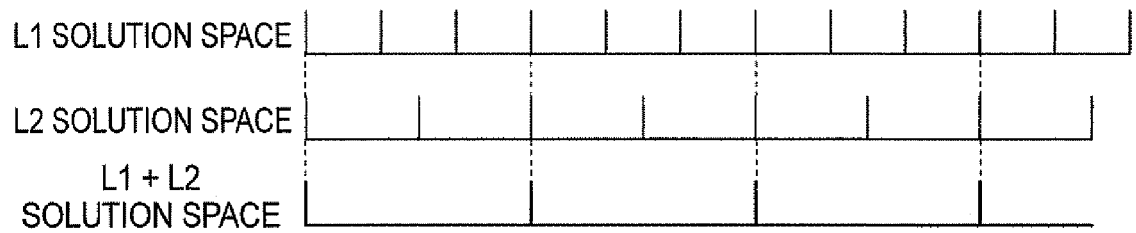
FIG. 4 is an explanatory diagram of fixed solution search space for two frequencies.

When searching for a fixed solution, as long as a two frequency GPS receiver is employed, as illustrated in FIG. 4, the search space is made smaller by deriving a fixed solution consistent with both frequencies, and a fixed solution can be obtained with good precision. However, this method cannot be applied to situations in which a single frequency GPS receiver is employed.

Another method that might be considered utilizes the fact that the number of waves N is constant over time, and derives an average of the numbers of waves N derived at plural points in time. In such a case there is the issue that a long duration is required until the estimated number of waves N converge, and there might be convergence to a wrong solution due to the influence of noise.

Figure 5:
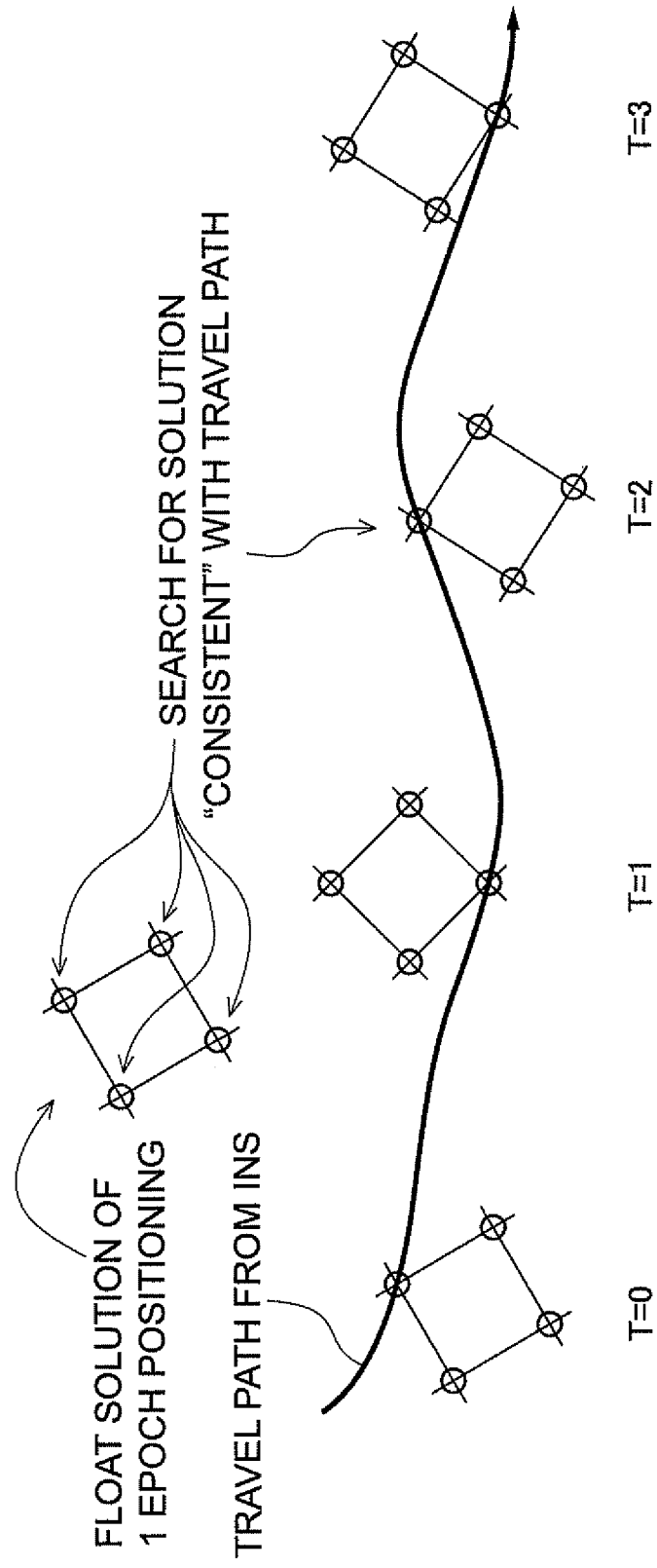
FIG. 5 is an explanatory diagram of the principles of the present exemplary embodiment.

Thus in the present exemplary embodiment, as illustrated in FIG. 5, the vehicle travel path estimated based on M epochs worth of INS data is used as a constraint when deriving a float solution for the number of waves N based on the GPS data and when employing this number of waves N to obtain a float solution for the vehicle position x. Namely, the precision of float solution is raised by deriving a float solution for the number of waves N consistent with M epochs worth of travel path, and the search range for the fixed solution is narrowed.

Figure 6:
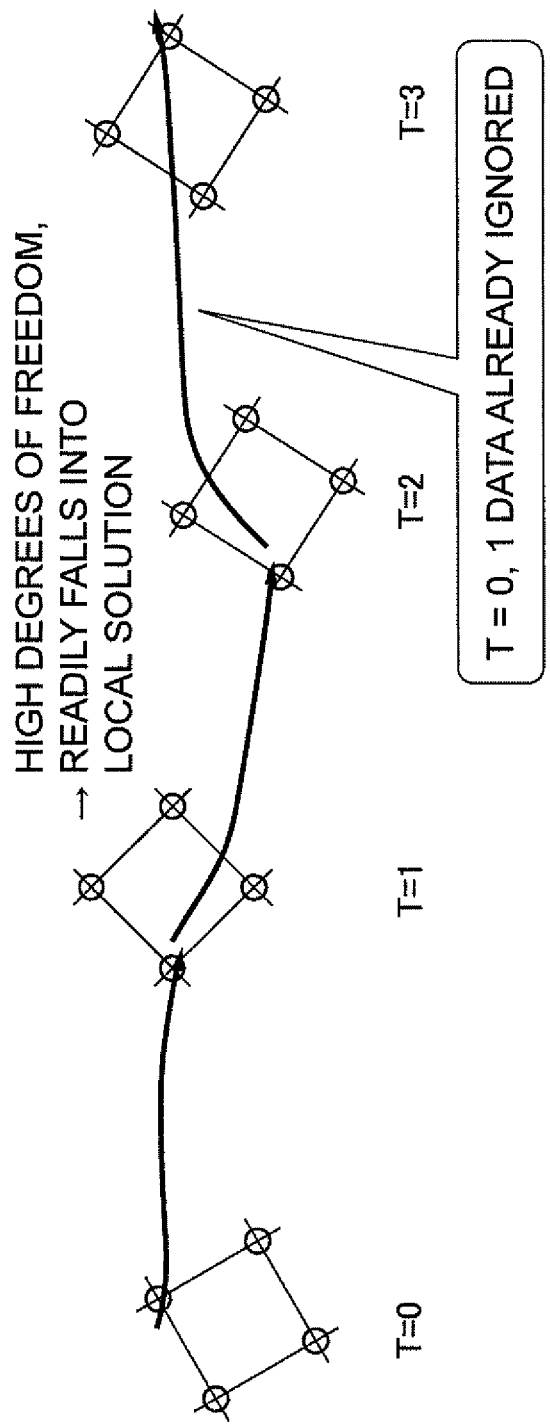
FIG. 6 is an explanatory diagram of issues when a Kalman filter is employed as a comparative example.

When employing a Kalman filter, this being one conventional method, as a method for combining GPS data and the INS data, as illustrated in FIG. 6, constraint is every two epochs, and there is a high degrees of freedom for the float solution, readily falling into a local solution. Thus when deriving the float solution, the number of epochs M for estimating the travel path that acts as a constraint when deriving the float solution is set at 3 or greater.

Figure 7:
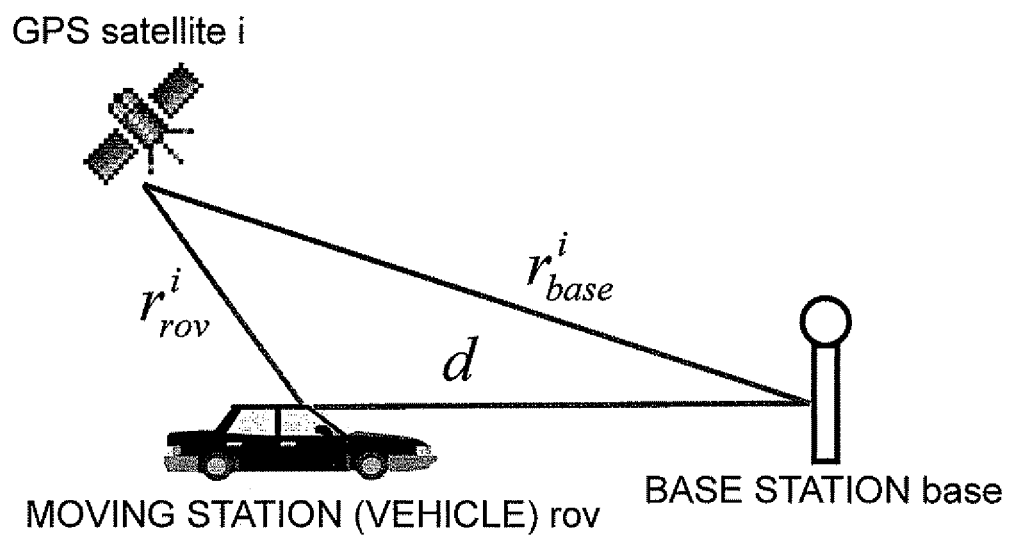
FIG. 7 is an illustration of a relationship between GPS satellite, moving station and base station.

The equation derivation section 24, according to the principles of the present exemplary embodiment described above, derives an observation equation for estimating the float solution of number of waves N and position x under M epochs worth of constraint condition with observation values of the GPS data and the INS data. Specifically, M epochs worth of GPS data stored in the M epoch data storage section 22 is acquired. As illustrated in FIG. 7, for a moving station (vehicle) rov, each parameter is determined as set out below based on GPS data received from a base station base at a known position and GPS data received from each GPS satellite i, and based on INS data acquired by the INS device 14. Note that i indicates a GPS satellite number (1 to n) and j indicates an epoch number (1 to M).

$r_{rov}^{i,j}$: $j^{th}$ epoch geometric distance between the GPS satellite i and moving station $d\phi_{i,j}=(\phi_{base}^{i,j}-\phi_{rov}^{i,j})-(\phi_{base}^{r,j}-\phi_{rov}^{r,j})$:
double difference of phase observation between GPS satellite i and base satellite r $d\rho_{i,j}=(\rho_{base}^{i,j}-\rho_{rov}^{i,j})-(\rho_{base}^{r,j}-\rho_{rov}^{r,j})$:
double difference of pseudorange between GPS satellite i and base satellite r $dr_{i,j}=(r_{base}^{i,j}-r_{rov}^{i,j})-(r_{base}^{r,j}-r_{rov}^{r,j})$:
double difference of distance between GPS satellite i and base satellite r $dN_i=(N_{base}^i-N_{rov}^i)-(N_{base}^r-N_{rov}^r)$:
double difference of N between GPS satellite i and base satellite r (fixed M epoch)
$g_{rov}^{i,j}$: single direction vector from moving station towards GPS satellite i $dx_j=x_j-x_j^0$:
difference vector between true value and initial value of moving station location
$d\theta=\theta-\theta^0$: difference between true value and initial value of INS phase angle
$\Delta x_j$: movement amount vector of INS from $1^{st}$ epoch to $j^{th}$ epoch
$\lambda$: carrier wavelength Then, by employing these parameters, an observation equation for the GPS observation values illustrated in Equation (3) is derived. The covariance here of the GPS observation values is given by Equation (4) below.

$$\overbrace{\begin{bmatrix} d\phi_{1,1}\lambda - dr_{1,1} \\ \vdots \\ d\phi_{n,M}\lambda - dr_{n,M} \\ d\rho_{1,1} - dr_{1,1} \\ \vdots \\ d\rho_{n,M} - dr_{n,M} \end{bmatrix}}^{h_{gps}} = \overbrace{\begin{bmatrix} g_{rov}^{1,1} & 0 & 0 & \lambda & 0 & 0 & 0 \\ 0 & \ddots & 0 & 0 & \ddots & 0 & 0 \\ 0 & 0 & g_{rov}^{n,M} & 0 & 0 & \lambda & 0 \\ g_{rov}^{1,1} & 0 & 0 & 0 & 0 & 0 & 0 \\ 0 & \ddots & 0 & 0 & \ddots & 0 & 0 \\ 0 & 0 & g_{rov}^{n,M} & 0 & 0 & 0 & 0 \end{bmatrix}}^{G_{gps}} \begin{bmatrix} dx_1 \\ \vdots \\ dx_M \\ dN_1 \\ \vdots \\ dN_n \\ d\theta \end{bmatrix} \quad (3)$$

$$Q_{gps} = \begin{bmatrix} \sigma_\phi^2 & & & & & \\ & \ddots & & & 0 & \\ & & \sigma_\phi^2 & & & \\ & & & \sigma_\rho^2 & & \\ & 0 & & & \ddots & \\ & & & & & \sigma_\rho^2 \end{bmatrix} \quad (4)$$

Then M epochs worth of INS data stored in the M epoch data storage section 22 is acquired, and an observation equation of INS observation values is derived as illustrated in Equation (5) below. The covariance here of the INS observation values is given by Equation (6) below. Note that E, N and U represent the east, north and up direction components of vehicle position x.

$$\frac{1}{t}\left(\overbrace{\begin{bmatrix} x_2^{0E} - x_1^{0E} \\ x_2^{0N} - x_1^{0N} \\ x_2^{0U} - x_1^{0U} \\ \vdots \\ x_M^{0E} - x_1^{0E} \\ x_M^{0N} - x_1^{0N} \\ x_M^{0U} - x_1^{0U} \end{bmatrix}}^{h_{ins}} - \overbrace{\begin{bmatrix} \cos\theta^0 \Delta x_2^E + \sin\theta^0 \Delta x_2^N \\ -\sin\theta^0 \Delta x_2^E + \cos\theta^0 \Delta x_2^N \\ 0 \\ \vdots \\ \cos\theta^0 \Delta x_M^E + \sin\theta^0 \Delta x_M^N \\ -\sin\theta^0 \Delta x_M^E + \cos\theta^0 \Delta x_M^N \\ 0 \end{bmatrix}}^{G_{ins}\,x}\right) = \quad (5)$$

$$\frac{1}{t}\begin{bmatrix} 1 & & & -1 & & & 0 & -\sin\theta^0 \Delta x_2^E + \cos\theta^0 \Delta x_2^N \\ & 1 & & & -1 & & 0 & -\cos\theta^0 \Delta x_2^E - \sin\theta^0 \Delta x_2^N \\ & & 1 & & & -1 & 0 & 0 \\ & & & \vdots & & & & \\ 1 & & & -1 & & & 0 & -\sin\theta^0 \Delta x_M^E + \cos\theta^0 \Delta x_M^N \\ & 1 & & \cdots & -1 & & 0 & -\cos\theta^0 \Delta x_M^E - \sin\theta^0 \Delta x_M^N \\ & & 1 & & & -1 & 0 & 0 \end{bmatrix} \begin{bmatrix} dx_1^E \\ dx_1^N \\ dx_1^U \\ \vdots \\ dx_M^E \\ dx_M^N \\ dx_M^U \\ dN \\ d\theta \end{bmatrix}$$

-continued $$Q_{ins} = \begin{bmatrix} \sigma_v^2 & & 0 \\ & \ddots & \\ 0 & & \sigma_v^2 \end{bmatrix} \quad (6)$$

Then, the GPS observation value observation equation of Equation (3), and the INS observation value observation equation of Equation (5) are combined, to derive a GPS-INS observation equation as illustrated in Equation (7) below. The covariance of the GPS observation values of Equation (4) and the covariance of the INS observation values of Equation (6) are combined to obtain the covariance of the GPS-INS observation values as given by Equation (8) below.

$$h = \begin{bmatrix} h_{gps} \\ h_{ins} \end{bmatrix} = \begin{bmatrix} G_{gps} \\ G_{ins} \end{bmatrix} x \quad (7)$$

$$Q_h = \begin{bmatrix} Q_{gps} & \\ & Q_{ins} \end{bmatrix} \quad (8)$$

The float solution computation section 26 solves the GPS-INS observation equation derived by the equation derivation section 24, and computes the float solution of the vehicle state x (location, N, θ) using Equation (9). The covariance $Q_x$ is computed according to Equation (10) below.

$$x = (G^T Q_h^{-1} G)^{-1} G^T Q_h^{-1} h \quad (9)$$

$$Q_x = (G^T Q_h^{-1} G)^{-1} \quad (10)$$

Figure 8:
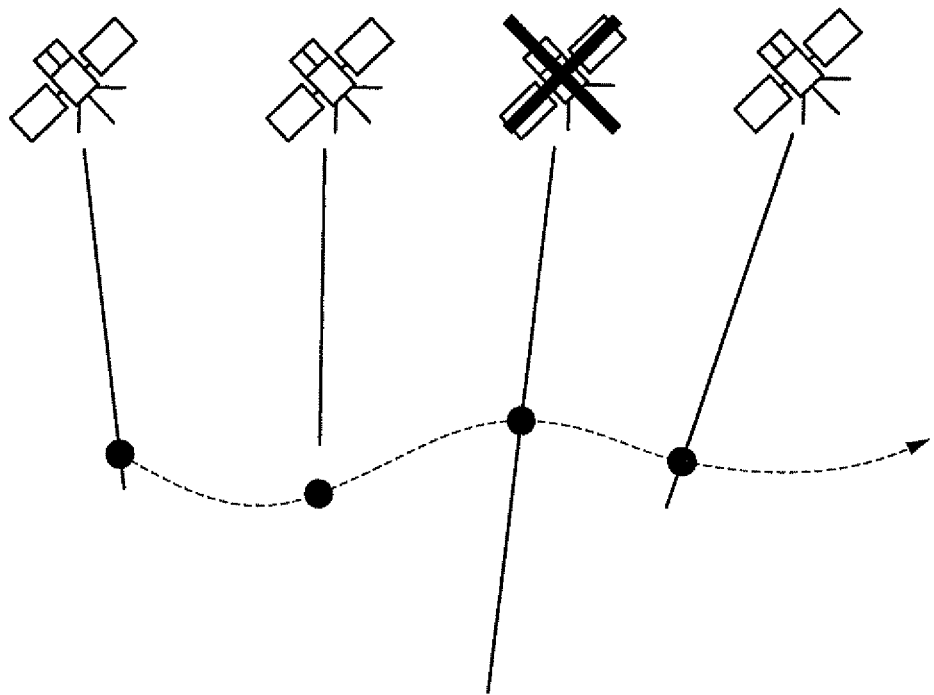
FIG. 8 is a diagram illustrating an inconsistent GPS satellite.

The satellite selection section 28 removes GPS data from GPS satellites transmitted with a pseudorange ρ inconsistent with the vehicle travel path estimated from the INS data. Inconsistent here means that, as illustrated in FIG. 8, there is a large difference between the distance from the point on the travel path at each of the epochs to the satellite position at the respective epoch and the pseudorange at the respective epoch. Specifically, in a state estimated by the GPS-INS observation equation of Equation (7), the residual errors to the actual observation values (phase φ, pseudorange ρ, vehicle speed v) are computed according to Equation (11) below:

$$r = h - Gx \quad (11)$$

$$= \begin{bmatrix} r_\phi \\ r_\rho \\ r_v \end{bmatrix}$$

wherein $r_\phi$ is the residual error in phase, $r_\rho$ is the residual error in pseudorange, and $r_v$ is the residual error in INS velocity. GPS data from GPS satellites with large residual errors r can be determined as having inconsistent GPS data that has been influenced by such factors as multi-paths and cycle slip. Accordingly, GPS satellite(s) with a residual error r of a specific threshold value or greater are removed as inconsistent GPS satellites, and the satellite number of these GPS satellites is output to the equation derivation section 24. In the equation derivation section 24 the GPS data is removed that has been received from the GPS satellites of the satellite numbers output from the satellite selection section 28, and the GPS-INS observation equation is derived again, and the float solution is re-computed in the float solution computation section 26.

Figure 9:
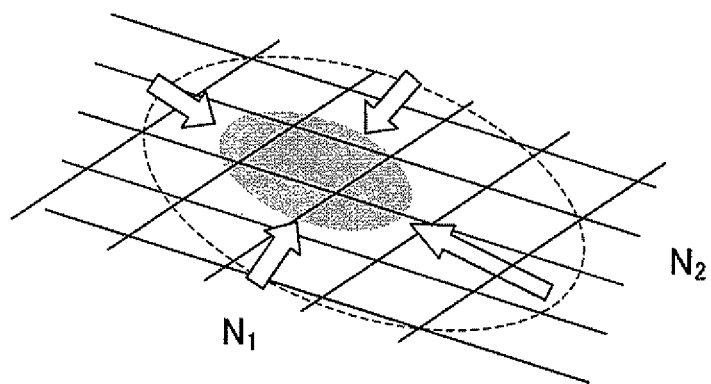
FIG. 9 is a diagram illustrating how a search range for a fixed solution is narrowed by constraining float solutions with M epochs worth of travel path.

The fixed solution computation section 30 computes a fixed solution from the float solution of vehicle state x computed by the float solution computation section 26 after the inconsistent GPS satellites have been removed by the satellite selection section 28. Computation of the fixed solution can be accomplished by employing a known method such as for example a Lambda method (XW Chang, 2005, MLAMBDA: A Modified LAMBDA Method for Integer Ambiguity Determination), x and $Q_x$ are input to Equation (9) and Equation (10), and the fixed solution is derived. When this is performed, the precision of the fixed solution can be checked using a method called a ratio test, and any fixed solutions with poor precision can be discarded. In the present exemplary embodiment, the GPS-INS observation equation derived by the equation derivation section 24 is, as stated above in the principles of the present exemplary embodiment, constrained by conditions of M epochs worth of travel path. Therefore, as illustrated in FIG. 9, the precision of the float solution computed by the float solution computation section 26 is raised, and since the search range of the fixed solution computation section 30 is narrowed, a fixed solution with high precision is also able to be computed in the fixed solution computation section 30. The fixed solution computation section 30 outputs the computed fixed solution as a positioning solution.

Figure 10:
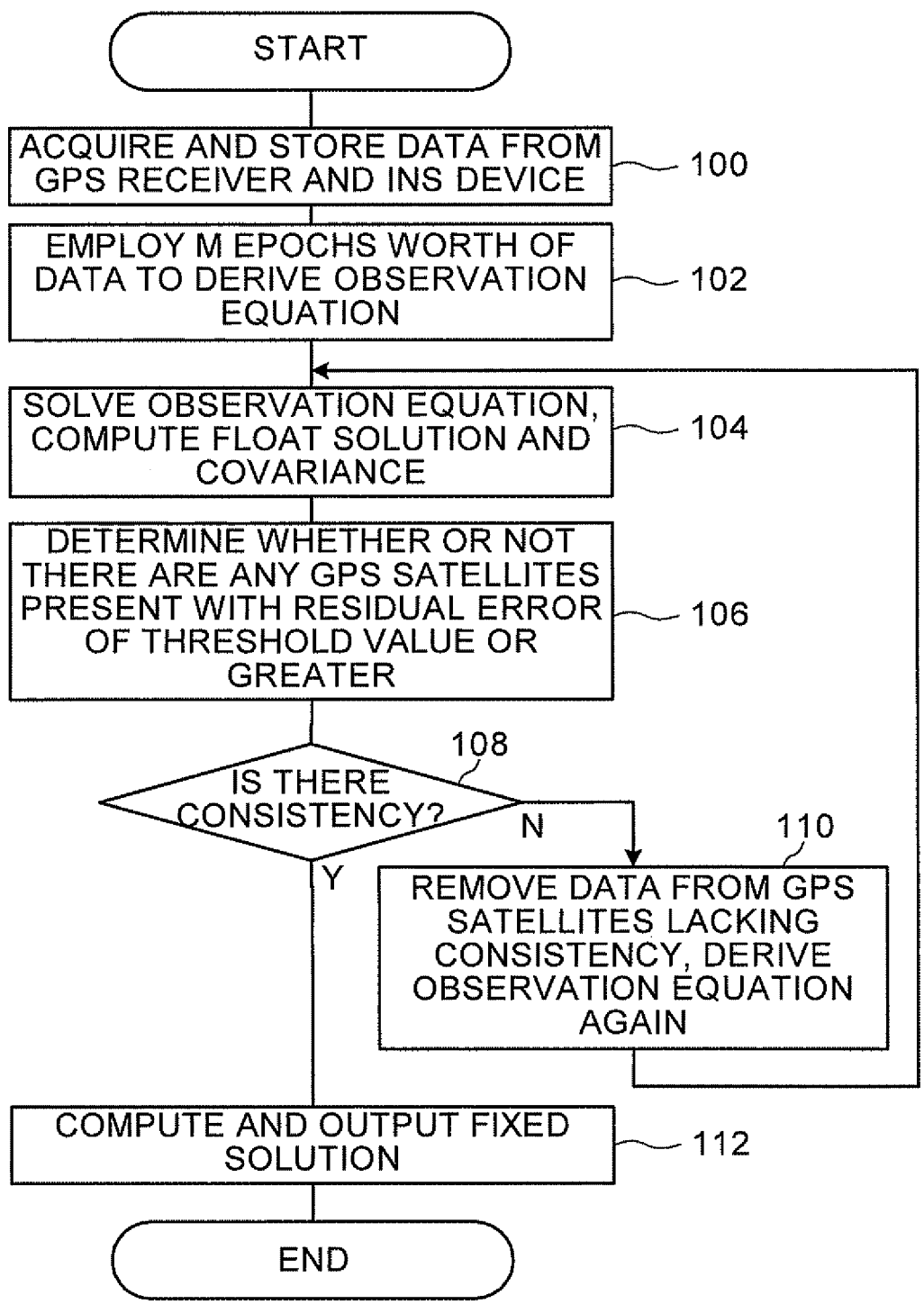
FIG. 10 is a flow chart illustrating content of a positioning processing routine in the present exemplary embodiment.

Explanation follows regarding a positioning processing routine executed by the positioning device 10 of the present exemplary embodiment, with reference to FIG. 10.

At step 100, the GPS data received by the GPS receiver 12 and, the INS data acquired by the INS device 14 is acquired for each epoch and stored in the M epoch data storage section 22.

Then at step 102, the M epochs worth of GPS data and INS data stored in the M epoch data storage section 22 is acquired, and an observation equation for the GPS observation values represented by Equation (3) and an observation equation for the INS observation values represented by Equation (5) are derived. When this is performed the covariance of the GPS observation values and the covariance of the INS observation values are derived according to Equation (4) and Equation (6). Then, Equation (3) and Equation (5) are combined, and the GPS-INS observation equation represented by Equation (7) is derived. The covariance of the GPS observation value of Equation (4) and the covariance of the INS observation values of Equation (6) are also combined, and the GPS-INS observation values covariance obtained as represented by Equation (8).

Then at step 104, the GPS-INS observation equation derived at step 102 is solved, and a float solution of vehicle state x (location, N, θ) is computed according to Equation (9), and the covariance $Q_x$ thereof is computed according to Equation (10).

Then at step 106, the residual error r is computed according to Equation (11), and determination is made as to whether or not there are any GPS satellites with a residual error r of a specific threshold value or greater, namely whether there are any inconsistent GPS satellites present. Then, based on the determination result of step 106, determination is made at step 108 as to whether or not the float solution computed at step 104 is consistent. When determined at step 106 that there is an inconsistent GPS satellite present, determination at step 108 is that there is lack of consistency, and processing transitions to step 110.

At step 110, out of the M epochs worth of GPS data acquired at step 102, the GPS data that was acquired from the GPS satellite(s) determined at step 106 to be inconsistent is removed, and the GPS-INS observation equation of Equation (7) is derived again, before returning to step 104.

At step 108, where determined that the float solution is consistent, namely that there are no inconsistent GPS satellites present, then processing transitions to step 112 where a fixed solution is computed using a known method from the float solution for the vehicle state x computed at step 104. The fixed solution is then output as a positioning solution, thereby completing the positioning processing routine.

Figure 11A:
FIG. 11A is a diagram illustrating positioning results (a comparative example) employing 1 epochs worth of data.
Figure 11B:
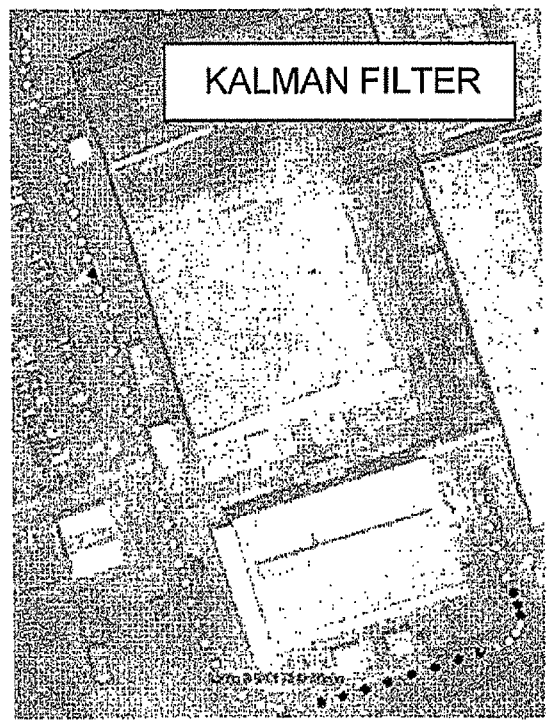
FIG. 11B is a diagram illustrating positioning results (a comparative example) employing a Kalman filter.
Figure 11C:
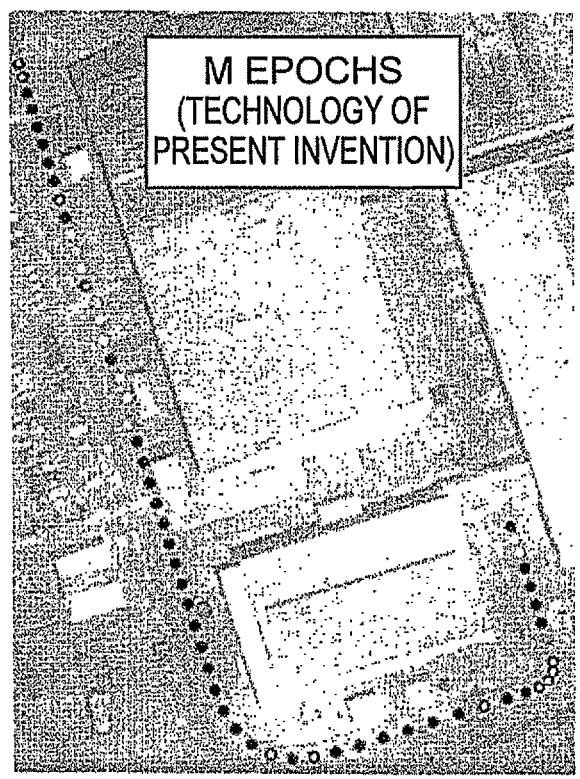
FIG. 11C is a diagram illustrating positioning results by the positioning device of the present exemplary embodiment.

FIG. 11A illustrates positioning results employing 1 epoch worth of data (comparative example), FIG. 11B illustrates positioning results employing a Kalman filter (comparative example), and FIG. 11C for illustrates an example of positioning results according to the positioning device of the present exemplary embodiment. The white circles indicate float solutions for vehicle position at each epoch and the black circles indicate fixed solutions. Fixed solutions removed by a ratio test are not illustrated. It can be seen that the positioning device of the present exemplary embodiment is able to perform positioning using fixed solutions with high precision at a greater number of locations than the other comparative examples.

As explained above, according to the positioning device of the present exemplary embodiment, when deriving a float solution of the number of waves N based on the GPS data and deriving a float solution for the vehicle position obtained by employing this number of waves N, the vehicle travel path estimated based on the M epochs worth of INS data is used as a constraint. Namely, the precision of the float solution is raised by deriving a float solution consistent with the M epochs worth of travel path, and the search range for the fixed solution is narrowed. A positioning solution can accordingly be obtained with good precision even when employing a single frequency GPS receiver.

Note that explanation has been given in the above exemplary embodiment of a case in which an observation equation is derived enabling computation at the same time of a float solution for the number of waves and a vehicle position obtained from this float solution. However, configuration may be made such that an observation equation is derived for determining only a float solution for the number of waves, and then after deriving a fixed solution for the number of waves, the vehicle position is computed employing the fixed solution of the number of waves.

Moreover, a case has been explained in the above exemplary embodiment in which inconsistent GPS satellites are selected using a satellite selection section, and GPS data from these GPS satellites is removed. However, configuration may be made to remove only the inconsistent GPS data from these GPS satellites rather than removing all of the GPS data from these GPS satellites.

What is claimed is:

1. A positioning device comprising:
  an acquisition section configured to, at prescribed epochs, acquire GPS data containing a pseudorange and a phase transmitted from each of a plurality of GPS satellites, and configured to acquire INS data containing a movement amount of a moving body to which the device is installed;
  a derivation section configured to derive an observation equation, employing the GPS data and the INS data acquired by the acquisition section as observation values, for deriving, for each of the plurality of GPS satellites, a float solution for a number of waves of carrier wave for the GPS data present between each of the plurality of GPS satellites and the moving body, wherein the observation equation is derived with a range of float solutions for the number of waves constrained by a travel path of the moving body estimated based on INS data for 3 epochs or greater;
  a computation section configured to solve the observation equation derived by the derivation section, the computation section being further configured to compute a float solution for the number of waves for each of the plurality of GPS satellites based on the observation equation; and
  a positioning section configured to, based on the respective float solutions of the number of waves for each of the plurality of GPS satellites computed by the computation section, compute a fixed solution of number of waves of highest consistency, and to determine a position of the moving body based on the distance between the plurality of respective GPS satellites from which the fixed solution of number of waves is obtained and the moving body, the positioning section being further configured to output the position of the moving body as a current location of the moving body.

2. The positioning device of claim 1, further comprising a controller that, based on the observation equation derived by the derivation section, controls to remove, from the GPS data acquired by the acquisition section, any GPS data containing pseudoranges with a residual error to the travel path of a predetermined threshold value or greater, or all GPS data transmitted from a GPS satellite that has transmitted the GPS data containing pseudoranges with a residual error to the travel path of a predetermined threshold value or greater, and controls the derivation section to derive an observation equation again.

3. A non-transitory storage medium storing a positioning program that causes a computer to function as:
  an acquisition section configured to, at prescribed epochs, acquire GPS data containing a pseudorange and a phase transmitted from each of a plurality of GPS satellites, and configured to acquire INS data containing a movement amount of a moving body to which the device is installed;
  a derivation section configured to derive an observation equation, employing the GPS data and the INS data acquired by the acquisition section as observation values, for deriving, for each of the plurality of GPS satellites, a float solution for a number of waves of carrier wave for the GPS data present between each of the plurality of GPS satellites and the moving body, wherein the observation equation is derived with a range of float solutions for the number of waves constrained by a travel path of the moving body estimated based on INS data for 3 epochs or greater;
  a computation section configured to solve the observation equation derived by the derivation section, the computation section being further configured to compute a float solution for the number of waves for each of the plurality of GPS satellites based on the observation equation; and
  a positioning section configured to, based on the respective float solutions of the number of waves for each of the plurality of GPS satellites computed by the computation section, compute a fixed solution of number of waves of highest consistency, and to determine a position the location of the moving body based on the distance between the plurality of respective GPS satellites from which the fixed solution of number of waves is obtained and the moving body, the positioning section being further configured to output the position of the moving body as a current location of the moving body.

* * * * *